United States Patent [19]

Fujiwara

[11] Patent Number: 4,839,747

[45] Date of Patent: Jun. 13, 1989

[54] IMAGE PROCESSING METHOD AND APPARATUS

[75] Inventor: Yasuo Fujiwara, Kanagawa, Japan

[73] Assignee: Fuji Photo Film Co., Ltd., Kanagawa, Japan

[21] Appl. No.: 66,274

[22] Filed: Jun. 25, 1987

[30] Foreign Application Priority Data

Jun. 25, 1986 [JP] Japan .................................. 61-148991

[51] Int. Cl.[4] .............................................. H04N 5/76
[52] U.S. Cl. ...................................... 358/342; 358/335
[58] Field of Search ................ 358/335, 342, 256; 360/14.1–14.3, 33.1, 35.1, 19.1, 32, 72.1, 15; 364/900, 200

[56] References Cited

U.S. PATENT DOCUMENTS

| | | | |
|---|---|---|---|
| 4,009,331 | 2/1977 | Goldmark et al. | 360/35.1 |
| 4,090,223 | 5/1978 | Holt | 360/35.1 |
| 4,264,808 | 4/1981 | Owens et al. | 358/342 |
| 4,295,154 | 10/1981 | Hata et al. | 360/33 |
| 4,425,586 | 1/1984 | Miller | 358/335 |
| 4,490,747 | 12/1984 | Yokoyama | 358/342 |
| 4,496,991 | 1/1985 | Dyfverman | 360/14.1 |
| 4,555,803 | 11/1985 | Hirose | 358/335 |
| 4,607,290 | 8/1986 | Murakami | 358/342 |
| 4,635,136 | 1/1987 | Ciampa et al. | 358/342 |
| 4,658,299 | 4/1987 | Tanaka et al. | 358/256 |
| 4,685,003 | 8/1987 | Westland | 358/335 |
| 4,786,980 | 11/1988 | Sonobe et al. | 358/335 |

*Primary Examiner*—Donald McElheny, Jr.
*Attorney, Agent, or Firm*—Sughrue, Mion, Zinn, Macpeak & Seas

[57] ABSTRACT

A method of reading an image recorded in an analog recording medium such as a microfilm and digitally recording the thus read image in a digital recording medium such as an optical disk. The method has independent steps: a step in which command data for allowing the image to be recorded is formed in a command data recording medium such as a floppy disk, and a step in which the image is read from the analog recording medium and recorded in the digital recording medium. With this method, it is possible to digitally record a large quantity of images consecutively at one time.

15 Claims, 13 Drawing Sheets

FIG. 12 (A)

| FIRST RETRIEVAL DATA | | SECOND RETRIEVAL DATA | | RELATED DATA | | |
|---|---|---|---|---|---|---|
| KEYWORD | | VOLUME NO. | DOCUMENT NO. | ADDRESS OF FIRST FRAME OF DOCUMENT | TITLE | DOCUMENT SIZE | PAGE NUMBER |
| 1 | 2 | | | | | | |
| P | A | 03 | 05 | 4101 | ABC PATENT | A4 | 8 |
| P | B | 03 | 06 | 4109 | XYZ REPORTS | A4 | 7 |
| Q | A | 03 | 07 | 4209 | O×△ PAPER | A3 | 1 |
| Q | C | 08 | 01 | 0001 | BIG BOOK | A3 | 2 |
| R | A | 08 | 11 | 8095 | EFG CARD | A3 | 115 |
| R | D | 12 | 09 | 7033 | LMN DIARY | A4 | 3 |

FIG. 12 (B)

| FIRST RETRIEVAL DATA | | | THIRD RETRIEVAL DATA | | RELATED DATA | | |
|---|---|---|---|---|---|---|---|
| KEYWORD | | DISC NO. | DOCUMENT NO. | DOCUMENT ADDRESS IN OPTICAL DISK | TITLE | DOCUMENT SIZE | PAGE NUMBER |
| 1 | 2 | | | | | | |
| P | A | 02 | 01 | 010107 | ABC PATENT | A4 | 1 |
| Q | A | 02 | 02 | 010108 | O×△ PAPER | A4 | 1 |
| R | A | 02 | 03 | 010109 | ECF CARDS | A3 | 12 |

IMAGE PROCESSING METHOD AND APPARATUS

BACKGROUND OF THE INVENTION

1. Field of the Invention

The present invention relates to an image processing method and apparatus and, more particularly, to an image processing method and apparatus in which an image or an image recorded in an analog recording medium such as a microfilm, paper or the like is read and then processed digitally so as to be recorded in another recording medium of digital type such as an optical disk or a magnetic tape.

2. Description of the Related Art

In general, office automation facilities, particularly for filing, are required to meet the following demands:
(1) High-speed input of a lot of information
(2) High-speed reproduction
(3) Validity as means of legal documentation
(4) Long-term storage capability
(5) Standardization of recording medium
(6) High resolution
(7) High recording density
(8) High retrieval speed
(9) Linkage with communication network
(10) Capability of providing instantaneous availability
 (For example, capability for enabling reading of data immediately after writing, without necessitating development or fixing)
(11) Ease of updating of data In general, microfilms have been recognized as filing means which cope with demands (1) to (7) above, whereas optical disk files are superior in that they meet the demands (7) to (11) above. Proposal has been made, therefore, for a composite filing system in which a microfilm filing system and an optical disk filing system are combined with each other. Such a composite filing system, which may be referred to as optical-microfilm composite filing system, is capable of coping with all the demands (1) to (11) above, because both the advantages of the microfilm filing system and the advantages of the optical disk filing system can be enjoyed. Examples of such composite systems are required, for example, in Information Media & Technology Volume 17 No. 3, pp 97–99, Information Media & Technology Volume 18 No. 3 pp 111–114 and Reprographics Quarterly, Vol. 16, No. 4 pp 141–149, as well as in Japanese Patent Laid-Open Nos. 64855/1984, 63860/1984 and 74144/1986 et al.

Microfilm filing system also is suitable for forming data image in confidence because the user can take a photo of an original data with a camera without requiring the original to be transported outside of, for example, a room. This advantage, together with the features of the microfilm set forth as (1), (3) and (4) above, leads to an idea that the recording of images which require high degree of confidence or images which are allowed to be brought out only for a short time would be carried out successfully if the original image data is first recorded in a microfilm and then the recorded image is read by means of a microfilm scanner the output of which is digitally processed so as to be recorded in an optical disk recording apparatus.

Such a method, however, suffers from a disadvantage in that, since the optical disk file does not allow the user to visually inspect the content of the record, the operator has to conduct a manual work for inputting retrieval data, when converting the microfilm file into optical disk file. The operation for reading an image and recording the same in an optical disk requires the operator to set various reading data necessary for the purpose of reading the image, such as the readable area of frame of microfilm, resolution with which the image is converted into digital data, e.g., 8 dots/mm, 16 dots/mm and so forth, and threshold for allowing discrimination between black and white. In consequence, the speed of conversion from microfilm data into optical disk data has been impractically low. In fact, it takes about 8 hours for converting 500 pages of images. In addition, services of the optical disk recording apparatus such as retrieval and printing are not available during the manual work for converting the microfilm file into the optical disk file. In consequence, the rate of operation of the expensive optical disk recording apparatus is impractically low.

SUMMARY OF THE INVENTION

Accordingly, an object of the present invention is to provide an image processing method and apparatus which are capable of continuously reading image data on an analog medium and digitally recording the thus read image data in a digital recording medium.

To this end, according to one aspect of the present invention, there is provided an image processing method for reading an image recorded in an analog recording medium and then recording the read image digitally in a digital recording medium, the method comprising: (a) a command data recording step in which command data which includes a retrieval data for enabling retrieval of the image to be recorded in the digital recording medium and a reading data for allowing the image recorded in the digital recording medium to be read is input and recorded in a command data recording medium; and (b) a digital image recording step in which, independently of the command data recording step, the command data is read from the command data recording medium, and the images recorded in the analog recording medium are read in accordance with the command data so as to be recorded digitally in the digital recording medium.

According to another aspect of the invention, there is provided an image processing method for reading an image recorded in an analog recording medium and then recording the read image digitally in a digital recording medium, the method comprising: a command data forming step in which command data which includes a retrieval data for enabling retrieval of the image to be recorded in the digital recording medium and a reading data for allowing the image recorded in the digital recording medium to be read is input and formed in a command data recording medium; and a digital image recording step in which, independently of the command data recording step, the command data is read from the command data recording medium, and the images recorded in the analog recording medium are read in accordance with the command data so as to be recorded digitally in the digital recording medium.

A description will be made hereinunder as to the meaning of the "command data".

The command data is composed of a retrieval data and reading data. The retrieval data is the data which is used for the purpose of retrieving image data to be recorded in the digital recording medium, and usually has the form of key items or key words. The reading data is the data which is necessary for reading the image from the analog recording medium. For instance, the reading data includes various data such as the address of the image in the analog recording medium, threshold for discrimination between black and white necessary for digitalizing the tone of the image, threshold value for half tone, resolution, and area to be read from one frame of image.

The step of forming the command data and the step of forming the digital image recording step are conducted independently. In addition, the command data formed on the command data recording medium is read at a speed which is much higher than the speed at which the command data is recorded in the command data recording medium by manual work of the operator.

It is therefore possible to digitally record a large quantity of analog image data into a digital recording medium consecutively at once.

These and other objects, features and advantages of the present invention will become clear from the following description of the preferred embodiments when the same is read in conjunction with the accompanying drawings.

BRIEF DESCRIPTION OF THE DRAWINGS

FIG. 12A is a table showing first and second retrieval data and related data stored in a floppy disk; and FIG. 12B is a table showing first and third retrieval data and related data stored in an optical disk.

DESCRIPTION OF THE PREFERRED EMBODIMENTS

Figure 1:
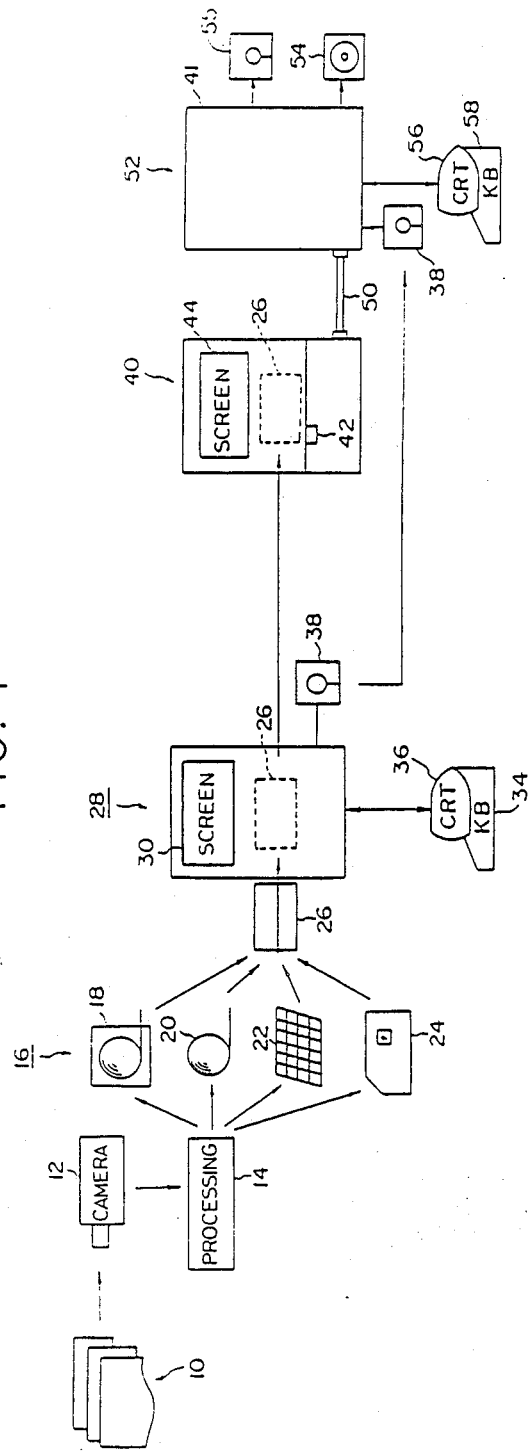
FIG. 1 is a schematic illustration of a file conversion system to which the present invention is applied.

The outline of a file conversion system to which the present invention pertains will be explained hereinunder with specific reference to FIG. 1.

A camera 12 picks up the image of an original 10. A microfilm in the camera is then subjected to a treatment process 14 in which are conducted development, fixing and rinsing, so that a microfilm 16 carrying a readable image is obtained. Various types of film are usable as the microfilm 16, such as 16 mm roll microfilm 18, 35 mm roll microfilm 20, microfish 22, aperture card 24 and so forth.

The photographing operation is conducted wherever the original 10 is placed, because the camera 12 has a high degree of portability. That is, the need for conveying the original outside is eliminated so that the original can be handled in confidence and is prevented from being missed. Even if the original is brought outside, it can be returned in a very short time because the photographing can be completed without requiring substantial time. Namely, the photographing can be conducted in a very high speed, say 5,000 to 10,000 images per 8 hours, which is about 10 to 20 times as high as the speed at which images are directly read and recorded in an optical disk by a scanner. Thus, the operator can return the original in a very short time. The microfilm enables the user or operator to visually check its content so that he can input the retrieval data even after the photographing. In contrast, the image recorded in an optical disk cannot be visually checked, so that the retrieval data has to be input simultaneously with the recording of the image. Furthermore, the microfilm has a high credibility as means of legal documentation and capability for storing data for long time.

Therefore, it would be advantageous to take images of all original and then convert and record only the necessary images into digital disk file, rather than to directly record images of all the images in the optical disk file. The microfilm 16 is loaded in a kit 26 specifically designed to match with the type of the microfilm, and is placed in a microfilm reader 28. The microfilm reader 28 has a screen on which the images of the images on the microfilm are projected. The frame feed of the microfilm 16 is conducted by, for example, an input signal input through a keyboard 34, and data such as the frame address is displayed on a CRT display 36. The operator, while watching the image projected on the screen 30 or looking into a memo, inputs the command data, e.g., retrieval data and reading data, relating to the image to be converted and recorded into the optical disk file. The command data is displayed on a CRT display, for a visual check for any error. After correction of error, if any, the recording instruction data is recorded in a floppy disk 38.

Conversion of the microfilm file into an optical disk file is conducted automatically and consecutively, independently of the above-described manual work. Namely, the kit 26 and the floppy disk 38 after completion of the process conducted by the microfilm reader 28 is loaded in a microfilm scanner 40 and a file controller 41. The images on the microfilm 16 in the kit 26 are projected onto a screen 44 and are read by a line sensor 42. The thus read images are then digitalized and delivered to the file controller 41 of the optical disk recording apparatus 52 through a data line 50. The floppy disk 38 is then loaded in the file controller 41 so as to be read by the latter, and the thus read data is delivered to the microfilm scanner 40 through the data line 50. Upon receipt of this data, the microfilm scanner 40 conducts various operations such as the film feed of the microfilm 16, projection of image and digitalizing operation, all of which have been described already. The digital image data from the microfilm scanner 40 and the retrieval data from the floppy disk 38 are processed by the file controller 41 and recorded in the optical disk 54. The retrieval data is recorded in a recording medium which is independent from the optical disk, e.g., in a floppy disk 55, and is used for the purpose of high-speed retrieval of data in the optical disk file. The recording instruction data and the digital image data are respectively displayed on a CRT display 56 so as to be monitored. Operation signals such as those for starting and stopping the operation are delivered to the file controller 41 through a keyboard 58. Typically, the microfilm reader 28, which is comparatively less expensive, may be installed in each of a plurality of offices, while the optical disk recording apparatus which is generally expensive is installed in the head office.

Figure 2:
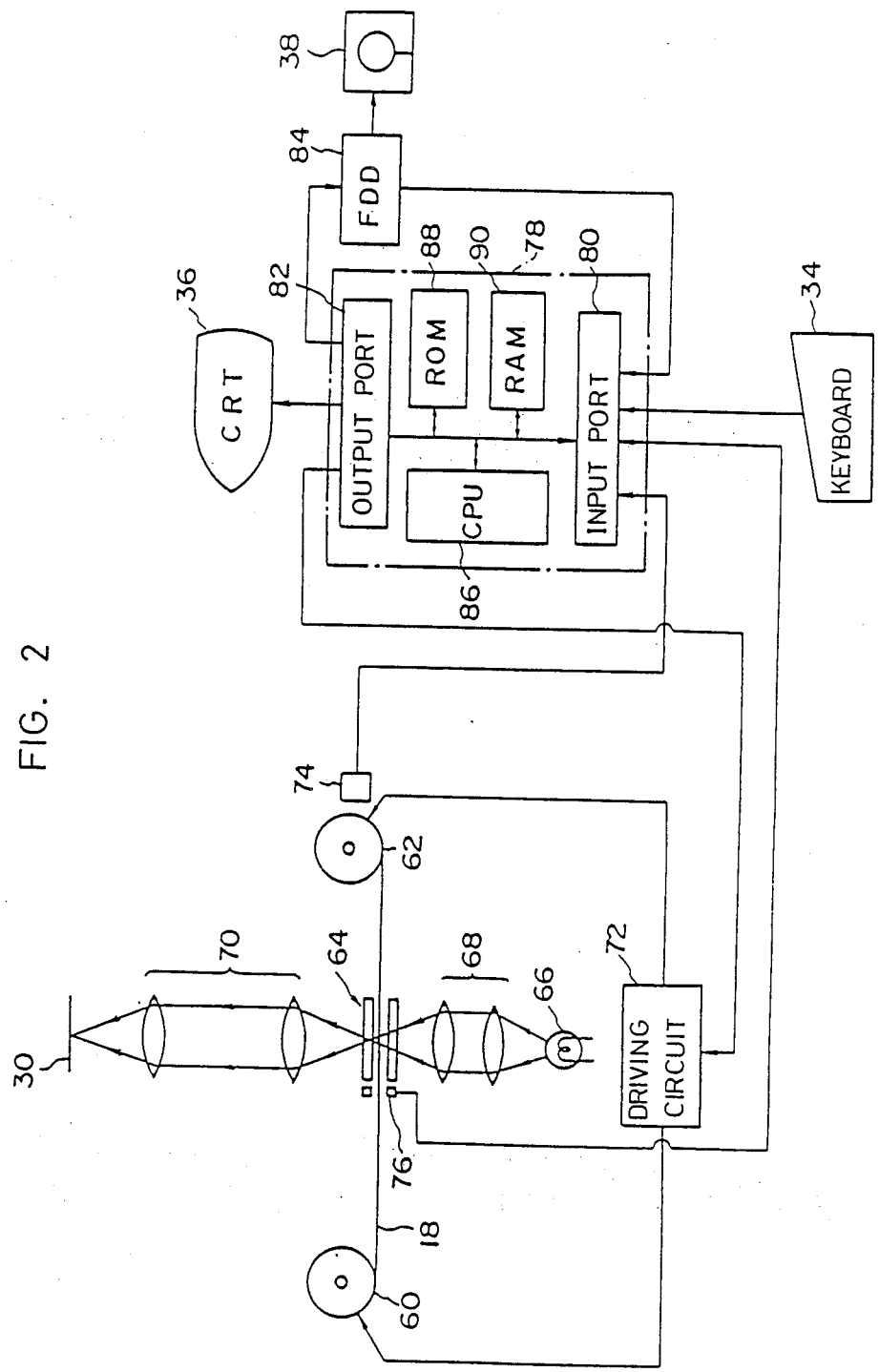
FIG. 2 is a schematic illustration of a microfilm reader incorporated in the system shown in FIG. 1.

The construction of the microfilm reader 28 will be described hereinunder with reference to FIG. 2.

In the illustrated example of the microfilm reader 28, the microfilm 16, which is a roll microfilm 18, is extracted from a supply reel 60 and is taken-up by a take-up reel 62. The intermediate portion of the roll microfilm extracted from the supply reel 60 is clamped by a pressing glass mechanism 64, so as to prevent the image projected on the screen 30 from being distorted. Light rays from a light source 66 is applied to the roll microfilm 18 through a condenser lens 68 and is transmitted through the roll microfilm 18 so as to project the image of the image on the roll microfilm 18 onto the screen 30 through a focusing lens 70.

The supply reel 60 and the take-up reel 62 are driven by motors which operate in response to drive signals given by a drive circuit 72. The rotation of the take-up reel 62 is detected by a pulse generator 74 which outputs one pulse for each rotation of the reel 62 through a predetermined small angle.

Figure 3:
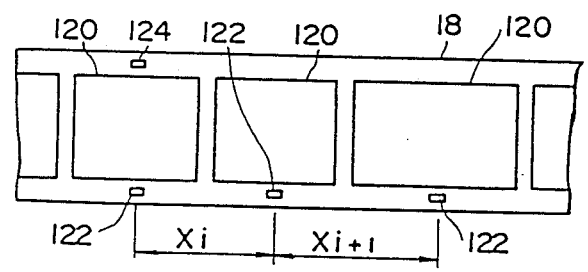
FIG. 3 is an illustration of the relationship between frames of a roll microfilm and a blip mark.

Simultaneously with the photographing of the original 10, page blip marks 122 corresponding to the respective frames 120 and the blip marks representing the border between the adjacent frame blocks are recorded by exposure on the edge portions of the film corresponding to the respective frames, as shown in FIG. 3. The addresses of the frames 120 can be detected by counting the page blip marks 122 and the file blip marks 124. As will be seen from FIG. 2, the page blip mark 122 and the file blip mark 124 are detected by a pair of blip mark sensors (photosensors) 76.

The signals from the pulse generator 74 and the blip mark sensors 76 are supplied to the input port 80 of a microcomputer 78 the output port of which delivers the motor control signals to the drive circuit 72 mentioned before. The operator operates the keyboard 34 while watching the images projected on the screen 30 or looking into the memo, so as to input record instruction data to the input port 80. The thus delivered command data is delivered through the output port 80 to the CRT display 36 for confirmation purpose. At the same time, the CRT display 36 displays the address of the projected image. Both a control signal and the command data are delivered from the output port 82 to a floppy disk driver 84 so that the command data is recorded in the floppy disk 38. The arrangement is such that the command data which has been stored in the floppy disk 38 is delivered to the input port 80 so as to make it possible to effect any addition, insertion, deletion and correction of the recorded data. The microcomputer 78 is equipped with a CPU 86, ROM 88 and a RAM 90. The CPU 86 is adapted for conducting tasks such as inputting and outputting of data in accordance with a program stored in the ROM 88, while RAM 90 provides facilities for temporary storage of the command data and the working area.

The microcomputer 78 has a software which will be explained hereinunder with reference to FIG. 4.

In the first step (Step 15), the operator decides whether it is necessary to load the microfilm 16, i.e.,- whether is necessary for inputting the command data while observing the image on the screen 30. If the loading is necessary, the operator loads the microfilm 16 in Step 154.

If the command data has been recorded in the form of a memo, the user need not load the microfilm. The loading, however, is often necessary in the case where the microfilm is a conventional film which has been fabricated without specific consideration for digital recording purpose.

The operator then selects the processing mode in Step 156. He can choose either a data forming mode for forming a new command data in the floppy disk 38 and an updating mode in which command data already stored in the floppy disk 38 is updated or supplied with additional information.

When the data forming mode is selected, formatting of the floppy disk 38 is conducted in Step 158. Meanwhile, the operator selects the type of the microfilm 16 and the frame retrieval mode, upon consultation with the menu displayed on the CRT display 36.

Various types of films such as a 16 mm roll microfilm 18, 35 mm microfilm 20, microfish 22 and an aperture card 24 all of which are shown in FIG. 1 are usable as the microfilm 16. In case of a microfish 22, it is necessary to input also additional data such as the number of frames in each line and columns and the number of the headers. The frame retrieval mode includes, referring to FIG. 3, a mode for appointing the frame by counting the number of the page blip marks and a mode in which the frame is appointed by counting first the number of the file blip marks 124 and then adding the number of the page blip marks counted after the final file blip mark 124.

The method for retrieving the data for searching out the frame to be projected is determined in accordance with the type of the microfilm 16 and the selected frame retrieval mode. These initial setting data is written in the RAM 90 through the keyboard. In case of the updating mode, however, the initial setting data is read from the floppy disk 38 and then written in the RAM 90.

Subsequently, in Step 160, an operation is conducted for appointing the address of the frame to be converted and recorded in the optical disk 54 in accordance with the optical disk 54. It is possible to appoint a plurality of frames at a time. The address or addresses thus appointed constitute part of the reading data.

When the microfilm 16 has been loaded n the microfilm reader 28 (Step 162), it is possible to conduct a retrieval for seeking the frame of the address which was appointed in Step 160. When this frame has been seeked in Step 166, a judgment is conducted in Step 168 so as to project the image on the screen 30.

The check for the presence of the appointed frames may be conducted collectively in a later-mentioned Step 180.

In Step 170, the operator visually checks the projected image and inputs the following reading data which is necessary for the microfilm scanner 40 to read the image.

When the microfilm 16 has not been loaded, the operator inputs the reading data upon consultation with the memo in which the command data is beforehand recorded. The reading data includes the following classes of data.

(1) Reading size

The image on the microfilm is upright or turned sideways, depending on whether the photographed original is of A4 or A3 size, as will be seen from FIG. 3. Before converting the image data into optical disk file data, therefore, it is necessary to appoint the area to be covered by the microfilm scanner 40.

(2) Reading resolution

Figure 5:
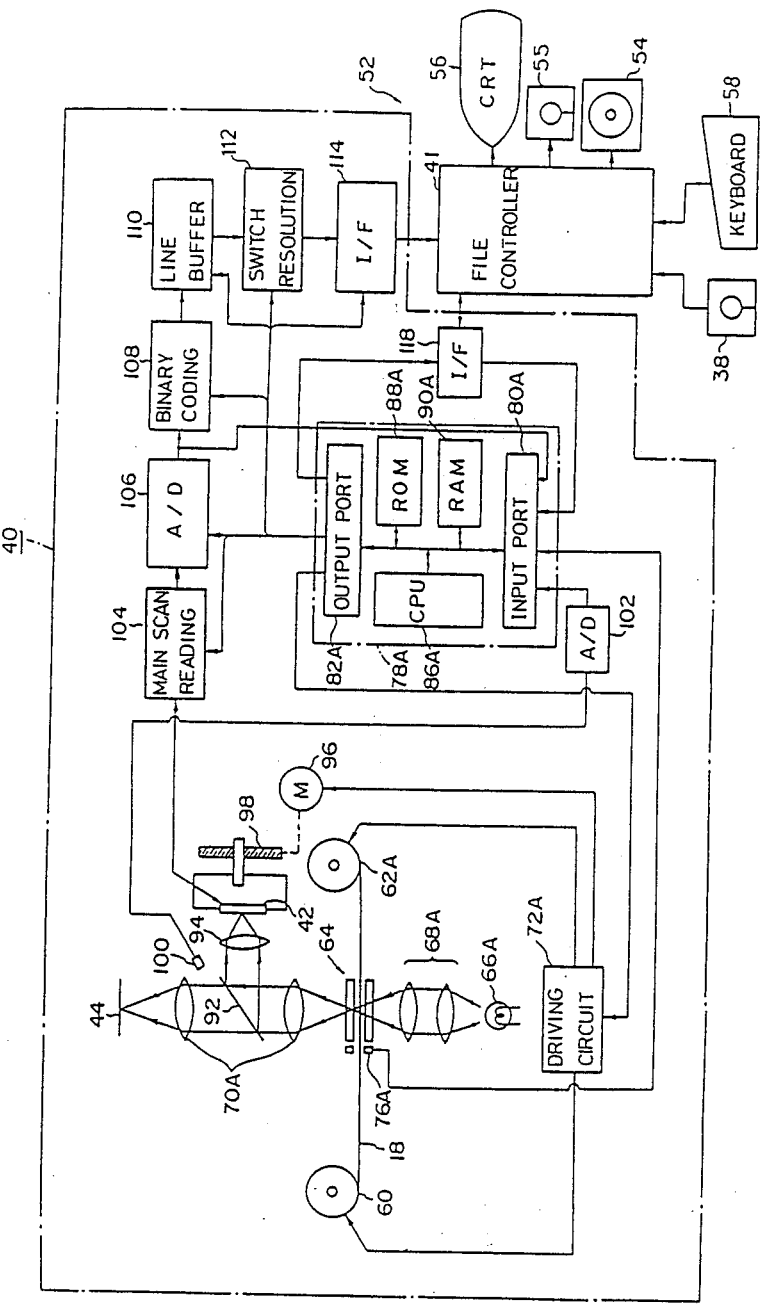
FIG. 5 is a schematic illustration of a microfilm scanner incorporated in the system shown in FIG. 1.

The reading resolution is switchable between 8 dot/mm and 16 dot/mm by means of a resolution change-over circuit 112 shown in FIG. 5.

(3) Threshold value for discrimination between black and white

The threshold value is used for discrimination of each pixel data between white and black, in a binary coding circuit 108 which is shown in FIG. 5. There are three modes for setting the threshold value: namely, an automatic setting mode in which the threshold value is automatically set in accordance with the result of detection of the quantity of projected light; a manual setting mode in which the operator sets the threshold value upon judging the projected image; and lock mode in which the threshold value is fixed and applied for successive frames. When the manual mode is selected, the user is required to input also the threshold value.

Although the binary coding is specifically mentioned, this is not exclusive and the image processing method of the invention can be applied also to the case where tone gradation is employed. The above-mentioned three modes, i.e.,the automatic mode, manual mode and locking mode, can also be applied to the case where tone gradation is employed. When the manual mode is selected, the user is required also to input the value of tone, e.g., thin or thick, in accordance with the density of the original image.

(4) Reading area

In some cases, it is required to convert only a portion of the projected image into the optical disk file. In such a case, it is necessary to appoint the area to be read. The reading area can be set either in trimming mode in which the area to be set is read and masking mode in which the area which is not to be read is appointed. Thus, the area to be read is input either through the trimming or the masking mode.

(5) Image polarity

It is also necessary to make a selection between a mode in which the image stored in the microfilm 16 is directly read (positive) or read after reversal (negative) between black and white.

(6) Number of images read

Setting is also necessary for the number of images or frames to be read under the same conditions (1) to (5), i.e., without requiring any change in the selection or values concerning the condition factors (1) to (5).

It is of course possible to set the total number of the frames within the range of addresses input in Step 160.

The process then proceeds to Steps 171 and 172. If inputting of the command data for a unit file has not been completed yet, the steps 160 to 170 are followed again. The term "unit file" is used here to mean a group consisting of at least one complete document, i.e.,a document or a group of documents in which the final document is not incomplete. The term "one document" means the range between adjacent file blip marks 124 shown in FIG. 3, which corresponds to one complete document such as a single patent specification.

In Step 166, a judgment is conducted as to whether the frame of the address appointed in Step 160 has been found in Step 164. If not, the process proceeds to Step 174 in which a sign indicative of address appointing failure is put on the CRT display 36. The process then returns to Step 160 so ad to allow the user to re-enter the address.

If the question in Step 172 proved that the reading instruction data has been input on the basis of document units, the process proceeds to Step 176 in which the operator inputs a retrieval data such as a key word necessary for enabling the user to search for the image after the digital recording in the optical disk 54. The key word is given for each document, and each document can be provided with a plurality of key words. When each document can be identified by any of a plurality of key words, the user can make access to this document from various aspects of the document.

When the microfilm 16 has been loaded on the microfilm reader 28 (Step 178), a check is done in Step 180 for the content of the reading data input in Step 170, while conducting frame feed of the film. The check is conducted for each of the following points.

(2) Addresses check

Retrieval is conducted through the microfilm to check whether frames corresponding to the addresses on the microfilm appointed in Step 160 exist.

(2) Reading size error check

The distance X (see FIG. 3) between the page blip mark 122 of the frame which is being projected and the blip mark 122 of the immediately preceding frame is measured. The distance X is compared with the width of the image determined by the reading size which has been input in Step 170, thus enabling determination as to whether the input reading data is adequate. The measurement of the distance X between the blip marks 122 is conducted by counting the pulses from the pulse generator 74.

(3) Check for error in setting of threshold between black and white

Adequate range of the threshold value has been beforehand stored in the ROM 88, and the check is conducted by judging whether the threshold value set in Step 170 falls within this range.

It is also possible to check whether the set threshold value is adequate, by making use of the detected value of the light quantity of the projected light rays.

(4) Check for error in setting reading area

The maximum readable area of the image frame is determined on the basis of the distance between page blip marks 122, and a judgment is conducted to determine whether the reading area set in Step 170 falls within the above-mentioned maximum readable area.

If the check conducted in Step 182 has proved that the input contains no error, and if it has proved in Step 184 that the input of the command data has not been completed for all the frames to be converted, the process returns to Step 160 in which the input operation is conducted once again.

Conversely, if the check in Step 182 has proved that the input contains any error, the content of the error is displayed on the CRT display 36, and the process returns to Step 160 or 170 so as to allow the operator to correct the input. The Step 160 is executed when the kind of the error is such one that requires again the retrieval of the image frame recorded in the microfilm.

Figure 4:
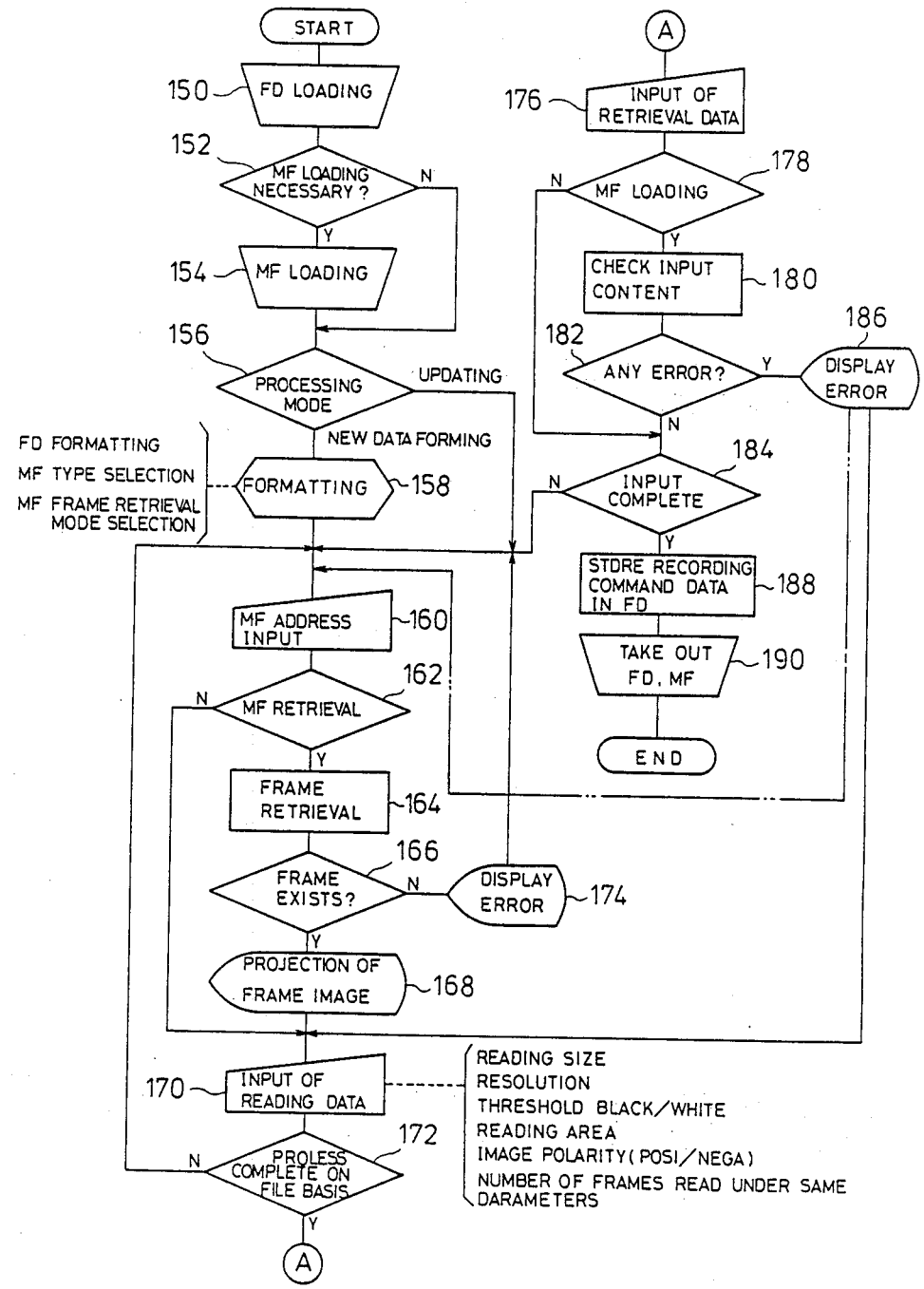
FIG. 4 is a flow chart illustrating the construction of a part of software of a microcomputer.

Although not shown in FIG. 4, input items which require no correction are skipped over during the correction of the defective input.

In Step 184, a judgment is conducted as to whether the input of the command data through the keyboard 34 has been completed. If the answer is YES, the process proceeds to Step 188 in which the command data stored in the RAM 90 is transferred to and recorded in the floppy disk 38 through the floppy disk driver 84. Obviously, when the updating mode has been selected in Step 156, updating and addition of data is conducted when the command data is recorded in the floppy disk 38.

Subsequently, in Step 190, the operator takes the microfilm 16 and the floppy disk 38 from the microfilm reader 28, thus completing the operation for recording the command data in the floppy disk 38.

In the process described above, when the microfilm 16 has not been loaded in the microfilm reader 28, the check of the content of the input command data is conducted visually through the CRT display. The flow for such a visual check, however, is omitted from the drawings.

When it is necessary to conduct a highly precise check of the content of the input command data, Step 180 shown in FIG. 4 is executed after mounting of the microfilm 16 on the microfilm reader 28. In this case, an answer YES is given to the question posed in Step 184. FIG. 4 shows, by way of example, a process in which the step of forming the command data and the step of checking the command data are impartible parts of a step. This, however, is not exclusive and the process may be such that the formation of the command data and the checking of the command data are executed as separate steps. In such a case, the formation of the command data may be conducted without employing the microfilm, while the checking is executed by employing the microfilm.

A description will be made hereinunder as to the microfilm scanner, with specific reference to FIG. 5. In this Figure, the same reference numerals with suffix A are used to denote the same parts or members as those used in FIG. 2, and detailed description of such parts or members is omitted.

The projection of the image of image onto the line sensor 42 and the screen 44 is conducted by rotating a mirror 92. The line sensor 42 is pre-scanned by means of a pre-scanner 98 which is adapted for horizontally scanning the projected image by means of a motor 96. An automatic exposure sensor 100 is disposed to direct towards the path of the projected light rays. The exposure sensor is adapted for detecting the quantity of light which has been transmitted through the film, and delivers the result of the detection to the input port 80 through an A/D converter 102. The signal from the automatic exposure sensor 100 is used for the purpose of controlling the mechanism (not shown) for adjusting the light quantity or for the purpose of controlling the lamp voltage so as to adjust the total light quantity output. The line sensor 42 is composed of, for example, a CCD which is adapted to conduct main scanning in accordance with pulses from a main scan and reading circuit 104. Electric charges corresponding to the quantity of light received by the element of the line sensor 42 are successively delivered to the main scan and reading circuit 104. The charges are then converted into voltages and supplied to an A/D converter 106 so as to be converted by the latter into digital values. The digital signals output from the A/D converter 106 is supplied to a binary coding circuit 108 and is converted either into a value "1" or a value "0" upon comparison with the threshold value from the microcomputer 78A. The thus obtained binary signal is then supplied to a line buffer 110 in a bit-by-bit manner. When the resolution is to be changed, the operation is as follows. As the data corresponding to two lines is supplied to the line buffer 110, the data is transferred to a resolution change-over circuit 112, so that the resolution is changed from 16 dot/mm to 8 dot/mm in accordance with a change-over signal from the microcomputer 78A. The binary-coded data is supplied to the file controller 114 through an interface 114. In addition, the exchange of data between the file controller 41 and the microcomputer 78A is conducted through the intermediary of an interface 118.

The microfilm scanner 40 is adapted for operating in accordance with a control command supplied thereto from the file controller 41 through the interface 118.

Figure 6:
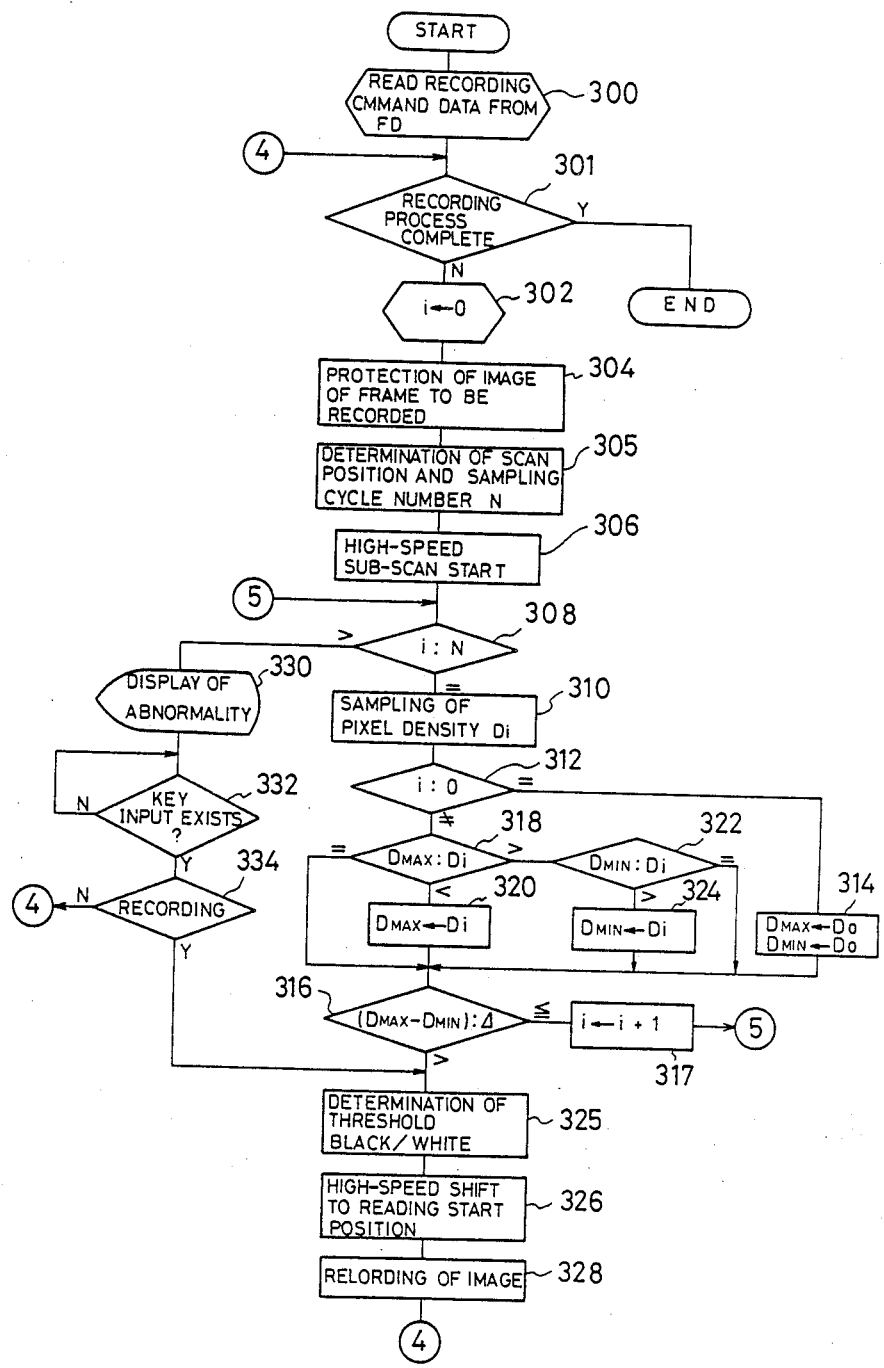
FIG. 6 is a flow chart showing the constructions of parts of a microcomputer and a file controller.

A description will be made hereinunder as to the software of the microcomputer 78A and the file controller 41, with specific reference to FIG. 6. This software is adapted for scanning the original 10 at a predetermined interval along a plurality lines (scan lines 11) of scan, and examines the degree of density of the whole area of the original by making use of the result of the scan as samples, and determines the threshold for the binary coding in accordance with the result of examination of the degree of density. The software then allows the image to be recorded in the optical disk 54. When the difference or degree of fluctuation of density over the entire area of the image is below a predetermined value, the software serves to inform the operator of this extraordinary state by displaying a sign indicative of the extraordinary state or by generating an alarm sound. The operator informed of the extraordinary state then determines whether the extraordinary image is to be skipped over o to be recorded in the optical disk.

This process is intended for determination of the threshold value and, hence, is conducted during preparatory scanning in advance of reading of the image data. The preparatory scanning is effected by the microfilm scanner 40 in accordance with the reading command given by the file controller 41. In some cases, however, it is required to consecutively read successive images and to determine the threshold value for each of the images in accordance with the degree of density of image on each image. In such cases, it is advisable to arrange such that the preparatory scanning is conducted during returning scan of the line sensor after the designated film frame is reached.

In Step 300, the floppy disk 38 reads the command data and transfers the same to the RAM 90A. Then, the process proceeds to Steps 301, 302 in which the value of a number i, which represents that the present sampling of image density is i-th sampling, is initialized to 0 (zero). Then, the process further proceeds to Step 304 in which the address of the frame to be converted is read out of the command data and the roll microfilm 18 is shifted such as to bring this frame to the position confronting the pressing glass mechanism 64. The image of the image in this frame is then projected onto the screen 44. The process then proceeds to Step 305 in which the positions of the scan lines 11 and the number N of the pixels to be sampled are determined in accordance with the reading size data and the reading area data which are included in the command data. Then, in Step 306, the pre-scan mechanism 98 is operated at a speed which is higher than that in the conversion into the optical file. The process proceeds to Step 308 and then to Step 310 in which the density $D_i$ of pixel is read from the output of the A/D converter 106. Since the condition is i=0 at the beginning, the process proceeds to Step 312 and then to 314 in which the maximum density $D_{MAX}$ and the minimum density $D_{MIN}$ are set at $D_O$. Subsequently, the process proceeds to Step 316 and then to 318 via Steps 308-312. In Step 318, the pixel density $D_i$ (i=1) is compared with the maximum density $D_{MAX}$. If the condition of $D_{MAX} < D_i$ is met, the process proceeds to Step 320 in which the value of the pixel density $D_i$ is entered as the maximum density $D_{max}$. When the condition of $D_{MIN} < D_i$ is met, the process proceeds to Step 324 past Steps 318 and 322. In Step 324, the value of the pixel density $D_i$ is set as the minimum density $D_{MIN}$. However, When the condition is $D_{MAX} = D_i$ or when $D_{min} = D_i$, the process proceeds to Step 316 without renewing the initial value of the maximum density $D_{MAX}$ or the minimum density $D_{MIN}$.

When the difference between the maximum density $D_{MAX}$ and the minimum density $D_{MIN}$ is below a predetermined small value $\Delta$, an incrementary operation for replacing i with i+1 is conducted in Step 317, and the process returns to Step 308 so that the above-described operation is repeated. As this operation is repeated, in normal cases, the difference between the maximum density $D_{MAX}$ and the minimum density $D_{MIN}$ usually becomes greater than the predetermined value $\Delta$. As the difference between density levels $D_{MAX}$ AND $D_{min}$ has become greater than the value $\Delta$, the process proceeds to Step 325 in which the threshold value for discrimination between white and black is determined in accordance with the known method. The process then proceeds to Step 326 in which the line sensor 42 is moved at high speed to the starting position for reading the image. This starting position is determined by the command data stored in the RAM 90A. Thus, when defined reading area has been appointed, the line sensor 42 is moved to the starting position. Then, the process proceeds to Step 328 in which the line sensor is moved to scan the image on the frame to be converted, so as to read the image on this frame on the basis of the threshold valued determined in Step 325. Thus, the image is red digitally and the thus obtained digital image data is delivered to the file controller 41 through the interface 114. The file controller 41 then operates to record the digital image data in the optical disk 54. At the same time, the file controller 41 operates to allow the retrieval key items included in the command data delivered from the floppy disk 38 to be recorded in the optical disk 54 and the floppy disk 55.

Figure 7:
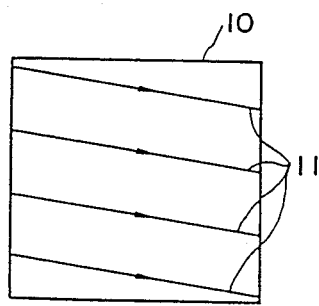
FIG. 7 is an illustration of lines of scanning of pixels which are used as reference for judgment as to whether all the pixels have an identical density.

When the number of the sampling cycles conducted for determining the pixel density $D_i$ has become greater than a predetermined number N, the process judges that the present frame carries no image. In the example shown in FIG. 7, the number N is set to be 4 times as large as the number of pixels included in each line. If it is judged that the present frame carries no image, the process proceeds from Step 308 to 330 in which a signal indicative of an abnormality in the image is delivered to the file controller 41 through the interface 118, so as to enable the CRT display 58 to display information representing the abnormality. The process then proceeds to Step 332, in which the system is ready for keyboard operation which is to be conducted by the operator who watches the image projected on the screen 44, as well as the indication on the CRT display.

The means for informing the operator of the abnormality may be constituted by other means than CRT display. For instance, alarming sound can effectively be used as the means for informing the operator of the abnormality. The arrangement also may be such that two modes are available in the event of any abnormality: namely, a mode in which the system waits for any instruction which may be given by the operator and a mode in which the system automatically processes the next image while skipping over the image having abnormality.

If the sampled scan lines 11 are of substantially the same density and provided that any image resides in areas between the scan lines 11, the operator can promote the process to Steps 334, 325 and then 326 so as to enable the system to conduct ordinary image processing routine, by pressing an image recording key on the keyboard 56.

However, if the operator has judged that there is no image on the frame in question, the process can be returned from Step 334 to Step 301, thus skipping over the frame in question. In consequence, this frame is not recorded in the optical disk 54.

It is, therefore, possible to avoid wasteful recording of defective frame having no image. This step also enables the operator to find any wrong appointment of the readable area. Namely, if the area of the microfilm having no image has been appointed wrongly though the frame has an image, the operator can be informed of the wrong appointment through the CRT display or the alarming sound.

The described process is repeated so that the images on the frame to be converted are successively recorded in the optical disk 54. Then, the process proceeds to Step 301 in which the completion of the recording operation is confirmed, thus finishing the entire process.

A description will be made hereinunder as to another method of checking for presence or absence of image on a frame of the microfilm.

Figure 8A:
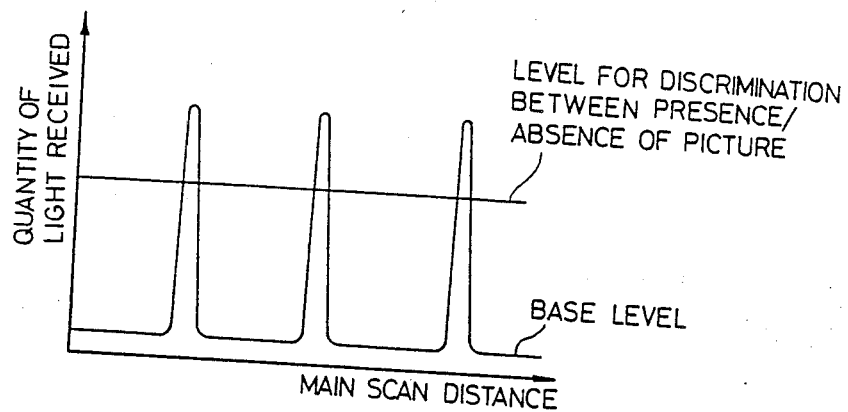
FIGS. 8A and 8B are diagrams illustrating quantity of lights received by a light-receiving element of a line sensor as obtained when an image is scanned with the line sensor, when the image is a positive image and when the image is a negative image, respectively.
Figure 8B:
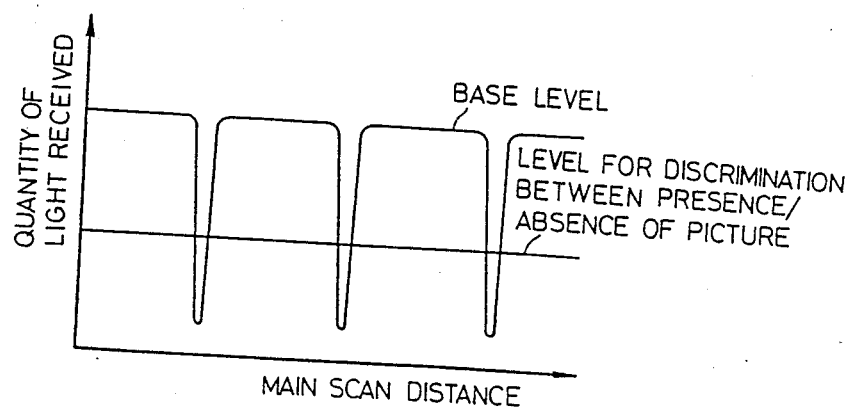

FIGS. 8A and 8B show the quantity of light received by a light-receiving element of the line sensor 42 as observed when the microfilm 16 is scanned by the line sensor 42 when the microfilm 16 is of negative type and positive type, respectively.

In the case where the image is a negative image, the system judges that the frame has a certain image, when the number of peaks of levels above a predetermine level exceeds a predetermined percentage. Conversely, when the number of such peak values is zero or below the above-mentioned predetermined level, the system judged that the frame has no image.

The discrimination between the negative type and positive type is conducted through judging whether the base level if below or above a predetermined level. More specifically, when the base level is below the predetermined level, the image is judged as being a negative image, whereas, if not, the image is judged as being a positive image.

It is possible to store retrieval data concerning the image (document) recorded in the analog recording medium, such as keywords, Patent Nos. and so on in a recording medium different from the analog recording medium, at an address corresponding to the address of the analog image in the analog recording medium. In such a case, the digital image and the retrieval data concerning the digital image can be recorded at an extremely high efficiency.

Figure 9:
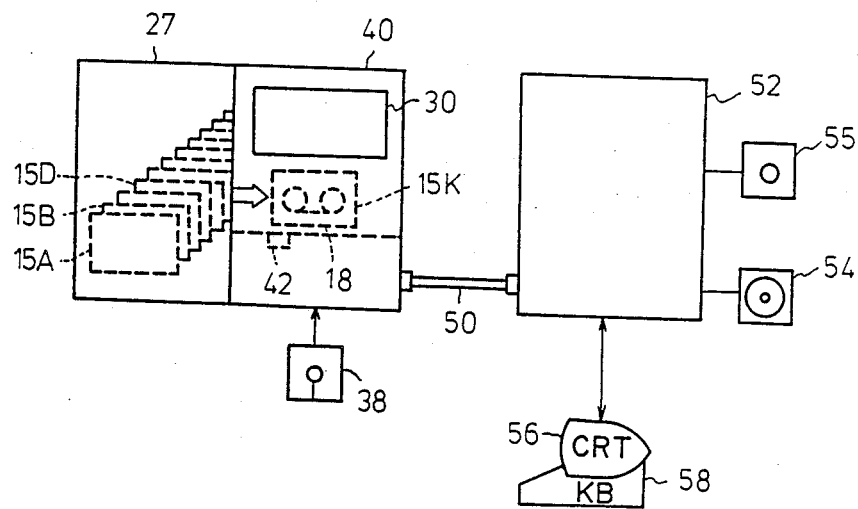
FIG. 9 is a schematic illustration of a second embodiment.

An embodiment of such an image processing apparatus will be described hereinunder with reference to FIG. 9.

This image processing apparatus is designed for recording, in an optical disk 54 as a digital recording medium, the image selected in accordance with designated retrieval data from among images recorded in a roll microfilm as an analog recording medium.

An auto-stocker 27 stocks cassette films 15A, 15B and 15C, and enables an appointed cassette film 15K to be automatically picked up and loaded on a microfilm scanner 40.

As the cassette film is loaded on the microfilm scanner 40, the image on the roll microfilm 18 in the cassette film 15, just positioned at the reading position, is projected on a screen 30 and is read by means of a line sensor 42 and then binary-coded. The microfilm scanner 40 is adapted to be loaded with a floppy disk 38 which serves as a first retrieval data recording medium. The floppy disk 38 stores first retrieval data such as keywords and second retrieval data such as Vol No., Document No., address of the first frame of the document, and so forth, as well as other related data such as the title, size of original from which the micro image is formed, number of pages of document, and so forth. The microfilm scanner 40 is connected to a file controller 52 through a signal line 50.

The file controller 52 is adapted to be loaded with an optical disk 54 and a floppy disk 55 which serves as a second retrieval data recording medium. The arrangement is such that the image data read by the line sensor 42 is recorded in an optical disk 54, and the first retrieval data of the thus read image is recorded in the optical disk 54 and the floppy disk 55. A keyboard 58 and a CRT display 56 are connected to the file controller 52. The operator can deliver to the microfilm scanner 40 and the file controller 41 the retrieval data concerning the image to be file-converted, by suitably operating the keyboard 58 in accordance with instructions given on the CRT display 56.

The construction of the microfilm scanner 40 will be described hereinafter with reference to FIG. 10. The roll microfilm 18 carrying micro-images recorded thereon is taken-up by a supply reel 60 as a motor 59 is driven, whereas, when a motor 61 operates, the roll microfilm is taken up by a take-up reel 62A. The angle of rotation of the take-up reel 62A is detected by a pulse generator 63.

As shown in FIG. 3, the roll microfilm 18 carries page blip marks 122 along the lower edge thereof at positions corresponding to the frames 120 and file blip marks along its upper edge for indicating the boundary between adjacent frame blocks each having a plurality of frames related to each other. The address of the frame 120 can be detected by continuously counting the page blip marks 122 and the file blip marks 124. These blip marks 122 and 124 are sensed by a blip mark sensor 76A shown in FIG. 10. The signal from the blip mark sensor 76A is delivered to a CPU through an input port 80A and is output from the latter as a motor drive control signal to a drive circuit 72A through an output port 82A, whereby the motors 59 and 61 are controlled so that the designated frames is brought to the reading position.

The image carried by the roll microfilm and positioned at the reading position is projected onto the line sensor 42. The line sensor 42 is adapted to be driven by a pre-scan mechanism 98 so as to effect a horizontal pre-scan over the projected image.

The line sensor 42 is composed of, for example, a CCD and is adapted for effecting a main scan in accordance with pulses transferred from a main scan/reading circuit 104, so that electric charges in amount corresponding to the quantity of light received by the elements of the line sensor 42 are successively supplied to the main scan/reading circuit 104. The thus supplied charges are converted into voltage and supplied to an A/D converter 106. The signal converted into the digital signals by the A/D converter 106 are delivered to a binary coding circuit 108 which is constituted by a digital comparator, so as to be converted into a signal of "1" or "0" level through a comparison with a threshold value supplied from a microcomputer 78A. The thus obtained binary signal is supplied to a line buffer 110 in a bit-by-bit manner. The operation for switching the resolution is as follows. As the data corresponding to two lines is supplied to the line buffer 110, the data is delivered to a resolution switching circuit 112 and a switching is conducted by this circuit from a resolution of 16 dots/mm to 8 dots/mm in accordance with switching instructions given by a microcomputer 78A. The binary-coded data is supplied to the file controller 41 through an interface 114. The exchange of the control signal and data between the file controller 41 and the microcomputer 78A is conducted through another interface 118. The floppy disk 38 is loaded on a floppy disk driver 95 so that the first retrieval data, second retrieval data and related data in the floppy disk 38 are read by the microcomputer 78A. In this embodiment, the floppy disk 38 and the floppy disk driver 95 are provided on the same side of the system as the microfilm scanner 40. Needless to say, however, the floppy disk 38 and the floppy disk driver 95 may be provided on the same side as the file controller 41.

Then digital signals corresponding to the image read by the microfilm scanner 40 is sent to the file controller 41 through the interface 114 and is stored in a digital recording medium which is in this case an optical disk 54. The first retrieval data and also the related data as required are stored in the optical disk 54. Third retrieval data such as the No. of the optical disk 54, No. of the document in the file stored in the optical disk 54 and the address of the leading frame of the document are determined when the digital signals corresponding to the read image are recorded in the optical disk 54. Then, the first retrieval data and the third retrieval data are recorded in a floppy disk 55 which serves as the second retrieval data recording medium.

Figure 10:
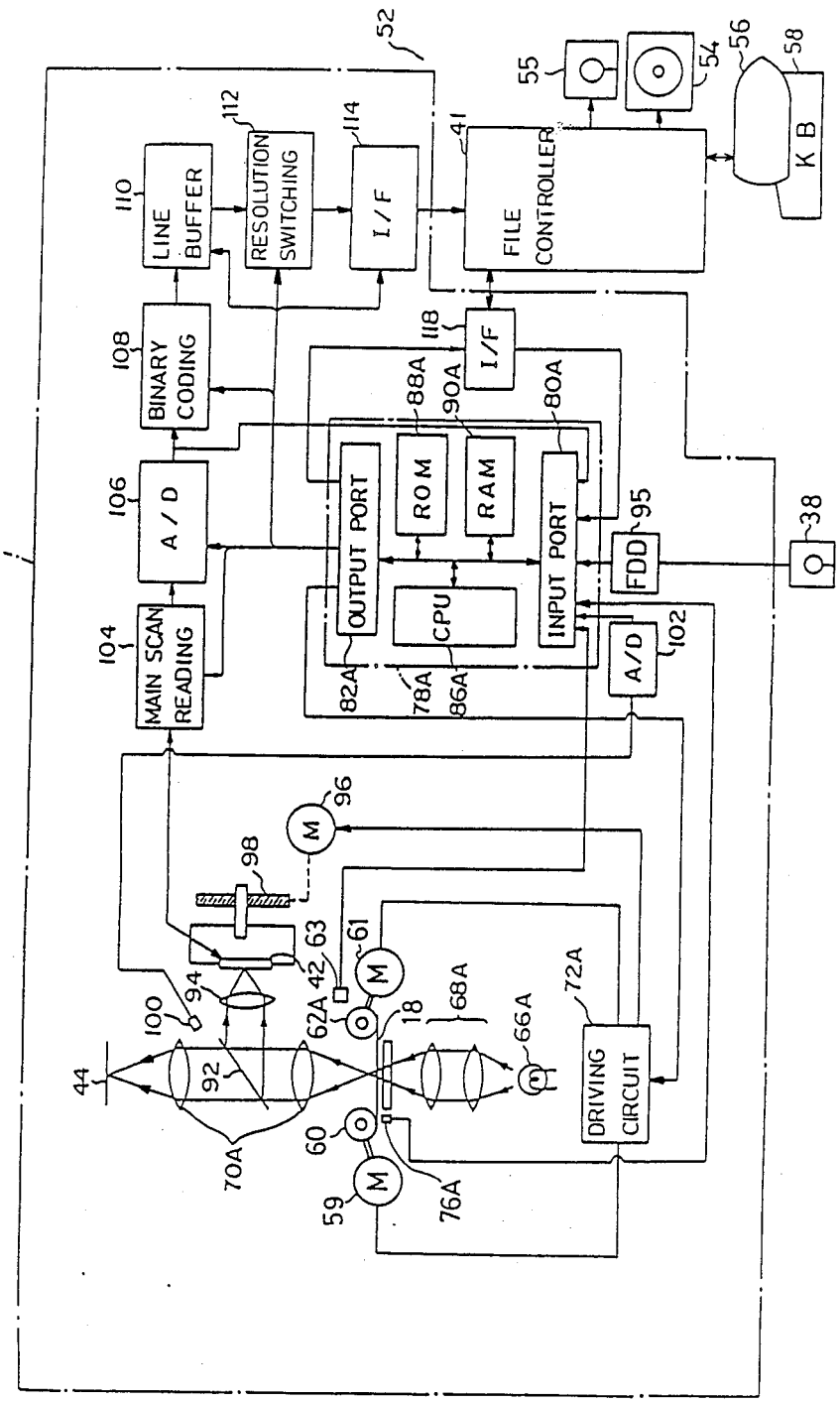
FIG. 10 is a block diagram of a microfilm scanner used in the embodiment shown in FIG. 9.

In FIG. 10, the same parts or constituents as those in the preceding embodiments are denoted by the same reference numerals as those appearing in FIG. 5 and detailed description thereof being omitted.

A description will be made hereinunder as to the software of the microcomputer 78A and the software of the file controller 41, with specific reference to FIGS. 11 and 12.

Figure 11:
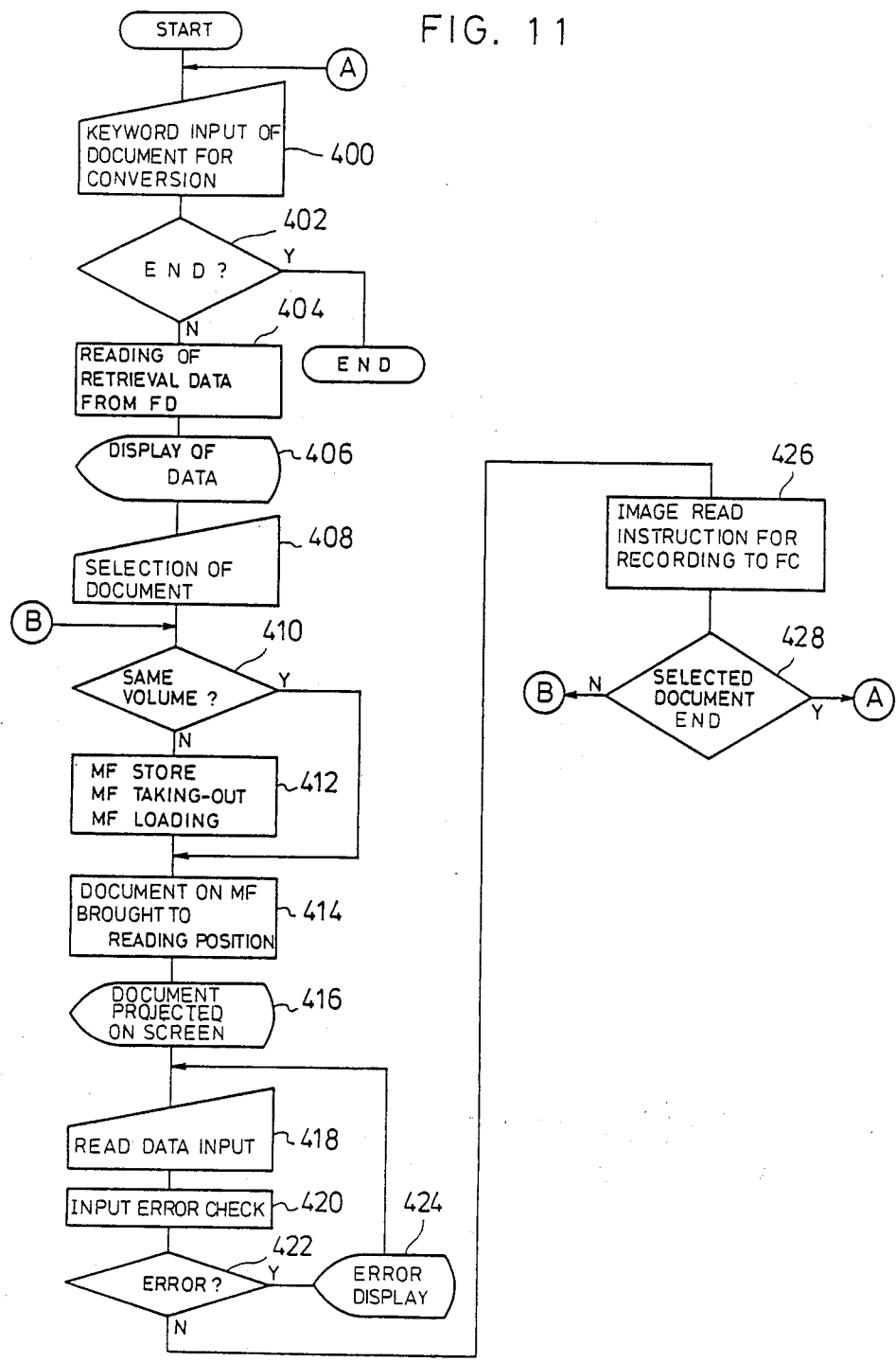
FIG. 11 is a flow chart showing the flow of the second embodiment.

FIG. 11 shows a flow chart. FIG. 12A shows the data recorded in the floppy disk 38, i.e., the first retrieval data (keywords), second retrieval data (Vol. No., document No. and address of the leading frame) and related data, while FIG. 12B shows the first retrieval data (keywords), third retrieval data (disk No., document No., address of document in optical disk) and related data all of which are stored in the optical disk 54 and the floppy disk 55. In FIG. 12A and 12B, the keywords as the retrieval data are illustrated in a simplified form for the purpose of easiness of understanding.

In Step 400, the operator operates the keyboard 58 so as to input the keyword of the document which is to be converted from the microfilm file to the optical disk file. For the purpose of simplification of explanation, the keyword is represented by "A" hereinunder. The process proceeds to Steps 402 and 404 unless a key operation of finishing the processing is executed in Step 400. As a result, the keyword A and a keyword retrieval command are delivered to the microfilm scanner 40. In response to the delivery of these signals, the microfilm scanner 40 picks up documents which include the keyword A from the floppy disk 38. In the example shown in FIG. 12A, three documents: namely, PA, QA and RA are picked up. In Step 406, the picked up first retrieval data, second retrieval data and the related data, as well as display command, are delivered from the microcomputer 78A to the file controller 41. In accordance with these inputs, the CRT display 56 displays the picked up data so that the operator can confirm the displayed data and select the document to be file-converted through a key operation. It is assumed here that all the displayed documents PA, QA and RA are selected by the operator. The file controller 41 then delivers to the microfil scanner 40 the second retrieval data of the selected documents and retrieval command. Among the selected documents, the document PA is first sent to Step 410 for digital conversion. The CPU 86A then compares the Vol. No. "03" constituting the first data of the second retrieval data with the Vol. No. of the cassette film 15K loaded on the microfilm scanner 40. If both are not equal to each other, the process proceeds to Step 412 in which the cassette film 15K on the microfilm scanner 40 is returned to the auto-stocker 27 and gives instructions to the auto-stocker to furnish a cassette film while appointing the cassette film No. as No. 3. In response to the instructions, the auto-stocker 12 furnishes the cassette film of Vol. No. 3 and loads it on the microfilm scanner 14.

Then, in Step 414, the motor 61 is started so that the roll microfilm 18 is taken-up by the take-up reel 62A. Meanwhile, the blip mark sensor 76A counts the file blip marks 124. The motors 59 and 61 are controlled such that the count value becomes "5" so that the first frame image of the document No. 5 is brought to the reading position. It is also possible to locate the first frame of the document No. 5 at the reading position by counting the page blip marks 122 and driving the motors 59 and 61 such that the count value becomes "101". In Step 416, the image located at the reading position is projected on the screen 30. In Step 418, the operator confirms this image and operates the keyboard 58 so as to input reading data necessary for reading the image by the line sensor 42. The reading data are, for example, as follows:

(1) reading size, (2) reading resolution, (3) black/while judging threshold, (4) reading area, (5) polarity of image These reading data are materially the same as those mentioned before, so that detailed description thereof is omitted.

In Step 420, the content of the reading data input in Step 418 is checked for any error. The error check includes, for example, the following checking items:

(1) Check for error in setting of black/white judging threshold (2) Check for error in setting of reading area These data also are the same as those in the preceding embodiments so that detailed description is omitted.

In Step 422, a judgment is conducted as to whether any input error exists. In case of any error being exist, the content of the input error is displayed on the CRT display 56 in Step 424. The process then returns to Step 418 and the reading data is input again. If there is no error, the process proceeds to Step 426 in which a mirror 92 is rotated so as to project the image onto the line sensor 42, and the motor 96 operates to allow the image data to be read in accordance with the reading data. The thus read-out image data is sent to the file controller 41 together with the recording command. The file controller 41 then operates to record the image data in the optical disk 54. When the recording of the image data is over, the first retrieval data (keyword), the third retrieval data (disk No., document No., document address in optical disk) and related data, all of which are shown in FIG. 12B, are recorded in the optical disk 54 and the floppy disk 55. The third retrieval data is for identifying and retrieving the documents recorded in the optical disk 52 and is recorded in a certain relation to the first retrieval data (keyword). The recording of these data in the floppy disk 55 is intended for enhancement of the retrieving speed. The recording of these data in the optical disk is intended for back-up: namely, for making it possible to record these data in a new floppy disk 55 in the event that the floppy disk 55 is lost or the retrieval data recorded is the floppy disk 55 is broken.

In this embodiment all the data are recorded in the optical disk 54. This, however, is not exclusive and the optical disk may store only such data that have to be stored in this disk. It is preferred to arrange such that the related data which are stored in predetermined areas among all related data, e.g., Title and the Document Size, are recorded also in the floppy disk 55 as related data. Such an arrangement will eliminate laborious work for inputting these related data.

In Step 428, the file conversion for the documents QA and RA have not been completed yet, so that the answer is NO and the process returns to Step 410. Then, the steps 410 to 426 are cyclically executed so that the documents QA and RA are recorded in the optical disk 54. The document RA is recorded in a cassette film 15 of a different Vol. from that storing the document QA, so that the answer NO is given to the question in Step 410, thereby initiating the operation for changing the cassette film.

The file controller 41 is provided with a buffer memory which is capable of temporarily storing the image data delivered through the interface 114. Therefore, the operation of Steps 410 through 428 and the process for recording of the image data in the optical disk 54 performed by the file controller 41 are conducted simultaneously.

In this embodiment, the manual input through the keyboard 58 for directly inputting the address of the document on the roll microfilm is not necessary. This in turn eliminates any input error and makes it possible to convert all the relevant images. In addition, the input operation is very easy because the operator is required only to input a predetermined keyword as the retrieval data for making access to the desired documents.

In the described embodiment, the keyword "A": is appointed so that three documents including the keyword "A" are extracted. This, however, is only illustrative and can be modified in various manners. For instance, it is possible to input and use, as the first retrieval data, a logical product (AND) or logical sum (OR) of keywords.

Though the first retrieval data in the described embodiment is constituted by a keyword, the first retrieval data may be constituted by other data such as AND of the Vol. No. and the document No. or, in case of Patent publications, Patent No. or other particular item. Thus, any data which can suitably be used in the retrieval of the document or image can be used as the first retrieval data. In case of Patent publications or similar documents, the input first retrieval data can be used directly as the second retrieval data. Thus, the first and the second retrieval data may be the same.

It is also to be understood that the provision of the auto-stocker is not essential.

In addition the floppy disks used as the first and second retrieval data recording medium in the described embodiment may be substituted by other types of recording medium such as hard disks depending on conditions such as storage capacity.

In the described embodiment, the first retrieval data is manually input through the keyboard 58. The arrangement, however, may be such that the first retrieval data is beforehand stored in a floppy disk by means of, for example, a personal computer or the like and is read by the file controller 52. It is also possible to arrange such that the first retrieval data is transmitted from an external device and is received by the file controller 52 or by the microfilm scanner 40.

The whole or part of the reading data may be added to the data recorded in the first retrieval data recording medium. In the described embodiment, the reading data are checked each time the file conversion is conducted. However, when the nature of the documents are the same as in the case of microfilm record of Patent publications, the reading data may be formed beforehand so as to simplify the input operation thereby improving the efficiency of the work.

In the image processing apparatus of the present invention, when the first retrieval data is input, the second retrieval data containing the first retrieval data, as well as related data, is searched out from the first retrieval data recording medium, and the image on the analog recording medium is moved to the reading position in accordance with the second retrieval data. The image is then read by the image sensor and is recorded in the digital recording medium. This eliminates the laborious manual work for directly and minutely inputting the address of the image carried by the analog recording medium. In addition, since the third retrieval data for enabling the image on the digital recording medium to be retrieved is recorded in the second retrieval data recording medium, it is not necessary to take labor of inputting the data for retrieving the digital image. In consequence, the input operation is simplified and facilitated and it becomes possible to quickly record the image carried by the analog recording medium onto the digital recording medium. These advantages are remarkable particularly when a large quantity of documents are to be processed.

In addition, since it is necessary only to input the first retrieval data corresponding to the image, the risk for the image of address to be erroneously appointed can be avoided. In addition, it is possible to ensure that all the images to be file-converted are recorded in the digital recording medium.

According to the invention, the recording medium for recording the command data may be constituted by various suitable means capable of temporarily storing data, such as a magnetic tape, a paper tape, and a RAM with back-up battery, although floppy disks are specifically mentioned. It is to be noted also that the microfilm used as the analog recording medium in the described embodiments are only illustrative, and various other mediums capable of being handled continuously, e.g., a paper sheet fed by an automatic feeder, may be used as the analog recording medium.

In the described embodiments, the reading of analog image is conducted by enlarging the analog image and then reading the enlarged image by a sensor. The enlargement of the analog image, however, is not essential. Namely, in some cases, the analog image is contracted and then read by the sensor. It is even possible to read the analog image by the sensor while keeping the sensor in close contact with the analog image.

It is to be understood also that the digital recording medium may be constituted by any medium which can store digital signals, although optical disks are specifically mentioned in the description of the embodiments. Thus, the digital recording medium may be, for example, a magnetic tape.

It is also possible to increase the reading speed by eliminating any mechanical pre-scan. This can be accomplished by, for example, employing an area sensor in place of the line sensor 42 used in the described embodiments.

The method and the apparatus of the invention may be carried out also in such a manner that the microfilm reader 28 incorporates an area sensor so as to directly read the image projected onto the area sensor. Such a measure will enhance the strictness of the criteria for the judgment of failure in the input of the command data. A comparatively inexpensive area sensor having fewer number cf pixel may be used for this purpose, because this area sensor is not intended for the recording of the image.

As will be fully understood from the foregoing description, according to the image processing method of the present invention, an image recorded on an analog recording medium is read and then recorded in a digital recording medium by employing two independent steps: namely, a step for recording, in a command data recording medium, command data concerning the image to be recorded, and a step for recording the image in the digital recording medium by reading the image in the analog recording medium in accordance with the command data read from the command data recording medium. Partly because these two steps are independent of each other, and partly because the speed at which the command data is read out from the recording medium is much higher than the speed at which the operator manually inputs such command data, it is possible to convert a large number of analog images into digital data and to store the same in the digital recording medium consecutively at a distinguished high speed.

What is claimed is:

1. An image processing method for reading an image recorded in an analog recording medium and then recording the read image digitally in a digital recording medium, said method comprising:

(a) a command data forming step in which command data which includes a retrieval data for enabling retrieval of the image of be recorded in said digital recording medium and a reading data for allowing said image recorded in said digital recording medium to be read is input and formed in a command data recording medium for subsequent use; and (b) a digital image recording step in which, independently of said command data recording step, said command data is read from said command data recording medium, and said images recorded in said analog recording medium are read in accordance with said command data so as to be recorded digitally in said digital recording medium, thereby allowing the images recorded in said analog recording medium to be digitally recorded in said digital recording medium automatically without an operator manually inputting command data during said digital image recording step.

2. An image processing method according to claim 1, wherein said command data input in said command data recording step is displayed on a display device.

3. An image processing method according to claim 1, wherein said digital image recording step includes: a projecting step in which, after said command data is read from said command data recording medium, the image to be digitally recorded is projected in accordance with said command data; a threshold value determining step in which the projected image is pre-scanned and a threshold for discrimination between white and black is determined in accordance with the result of the pre-scan; and a reading and recording step in which said image is read on the basis of said threshold value and recorded in said digital recording medium.

4. An image processing method according to claim 1, further comprising a command data checking step for checking said command data formed in said command data forming step for any error, by comparing said command data with data obtained by a frame-feed of said analog recording medium.

5. An image processing method according to claim 4, wherein said data obtained by the frame feed of said analog recording medium is the data concerning whether a frame corresponding to the appointed address actually exists, as obtained by counting blip marks provided on a microfilm at positions corresponding to the frames of said microfilms.

6. An image processing apparatus according to claim 4, wherein said data obtained by the frame feed of said analog recording medium is the data concerning frame size obtained by detecting the interval of blip marks provided on a microfilm at position corresponding to frames on said microfilm.

7. An image processing method according to claim 1, wherein, in said command data forming step, said retrieval data and said reading data are formed on separate recording mediums, whereas, in said digital image recording step, said reading data is repeatedly utilized while said retrieval data is reformed each time said digital image recording step is executed.

8. An image processing apparatus for reading an image recorded on an analog recording medium and for digitally recording the thus read image on a digital recording medium, comprising:
(a) command data input means (34–58) for inputting command data including retrieval data for retrieving an image to be recorded on said digital recording medium (54) and reading data for reading the image recorded on said analog recording medium (8);
(b) command data recording means (84) for recording, on a command data recording medium 38, said command data being input by said command data input means for subsequent use;
(c) digital conversion means (40) separate from said command data input means and said command data recording means and adapted for reading the image on said analog recording medium and converting the thus read image into digital signals; and
(d) digital recording means (41) for recording said digital signals on said digital recording medium (54), thereby allowing the images recorded on said analog recording medium to be digitally recorded on said digital recording medium automatically without an operator manually inputting command data to said digital recording means.

9. An image processing apparatus according to claim 8, wherein said analog recording medium is a microfilm, and said image recorded on said analog recording medium is a micro-image.

10. An image processing apparatus according to claim 8, wherein said command data recording medium is a floppy disk.

11. An image processing apparatus according to claim 8, wherein said command data recording medium is an optical disk.

12. An image processing apparatus for reading an image recorded on an analog recording medium and for digitally recording the thus read image on a digital recording medium, comprising:
(a) a first retrieval data recording medium storing first retrieval data for retrieving said analog image and second retrieval data correlated to said first retrieval data and adapted for specifying the position of said analog image;
(b) analog image moving means for appointing, when said first retrieval data is input, an analog image by means of said second retrieval data corresponding to said first retrieval data and for moving the appointed image to a reading position;
(c) reading and digital conversion means for reading said analog image moved by said analog image moving means to said reading position and converting the read image into digital signals;
(d) digital recording means for recording, on said digital recording medium, said digital image obtained from said digital conversion means; and
(e) a second retrieval data recording medium storing said first retrieval data and third retrieval data concerning said digital image on said digital recording medium, said third retrieval data being determined when said digital image is recorded by said digital recording means;
whereby, when said first retrieval data is input, said analog image specified by said second retrieval data corresponding to said first retrieval data is moved to the reading position so as to be read, the read image being then converted into digital image and recorded in said digital recording medium, said first retrieval data and said second retrieval data being recorded in said second retrieval data recording medium in a certain relation to each other and whereby the images recorded on the analog recording medium can be digitally recorded on said digital recording medium without an operator manually inputting retrieval data to said digital recording means.

13. An image processing apparatus according to claim 12, wherein said analog recording medium is a microfilm and said analog image is a micro-image.

14. An image processing apparatus according to claim 12, wherein said first retrieval data includes a keyword or a logical formula employing said keyword as a factor.

15. An image processing apparatus according to claim 12, wherein said first retrieval data recording medium and said second retrieval data recording medium are separate floppy disks.

* * * * *